United States Patent [19]

Henn

[11] Patent Number: 4,700,903

[45] Date of Patent: Oct. 20, 1987

[54] FOOD PROCESSOR WITH ADAPTERS FOR TRANSMISSION OF TORQUE TO ROTARY TOOLS

[75] Inventor: Stefan Henn, Solingen, Fed. Rep. of Germany

[73] Assignee: Robert Krups Stiftung & Co. KG., Solingen, Fed. Rep. of Germany

[21] Appl. No.: 926,864

[22] Filed: Nov. 3, 1986

Related U.S. Application Data

[63] Continuation of Ser. No. 708,352, Mar. 5, 1985, abandoned.

[30] Foreign Application Priority Data

Mar. 9, 1984 [DE] Fed. Rep. of Germany ....... 3408692

[51] Int. Cl.$^4$ .............................................. B02C 18/12
[52] U.S. Cl. ............................... 241/101.2; 241/37.5; 241/92; 241/282.2
[58] Field of Search .................... 241/37.5, 100, 101.2, 241/282.1, 282.2, 92, 199.12

[56] References Cited

U.S. PATENT DOCUMENTS 4,113,188  9/1978  Belinkoff ...................... 241/282.1 X
4,127,342  11/1978  Coggiola ...................... 241/282.1 X

FOREIGN PATENT DOCUMENTS

1152506  8/1963  Fed. Rep. of Germany ... 241/282.2

Primary Examiner—Howard N. Goldberg
Assistant Examiner—Joseph M. Gorski
Attorney, Agent, or Firm—Peter K. Kontler

[57] ABSTRACT

A food processor wherein the tool in the bowl is rotated by a spindle, which is driven by an electric motor, through the medium of an insulating sleeve and an adapter which receives torque from the sleeve and transmits torque directly to the tool or through the medium of a tool carrier. The insulating sleeve, the spindle and an inner tubular portion of the adapter are surrounded by a tubular extension which is integral with the bottom wall and extends into the interior of the bowl. An outer tubular portion of the adapter has a coupling device which cooperates with the internal coupling device of a tool when the latter is placed around the outer tubular portion. A shank which extends upwardly from the outer tubular portion of the adapter can be centered at the underside of a cover for the bowl and can have an additional external coupling element which transmits torque to a tool or to the carrier. The selected tool or the carrier can but need not be removed from the bowl with the adapter. The cover must be properly attached to the main portion of the bowl as well as to the housing of the food processor before the motor for the spindle can be started to rotate a selected tool in the bowl.

25 Claims, 20 Drawing Figures

FOOD PROCESSOR WITH ADAPTERS FOR TRANSMISSION OF TORQUE TO ROTARY TOOLS

CROSS-REFERENCE TO RELATED APPLICATIONS

This application is a continuation of application Ser. No. 708,352, filed Mar. 5, 1985, now abandoned.

Certain details of the food processor of the present invention are disclosed in the commonly owned copending patent application Ser. No. 645,439 filed Aug. 29, 1984 by Hubert Fühner et al. for "Food processor", U.S. Pat. No. 4,669,672.

The food processor which is shown in the drawing of the present application is identical with the food processor which is described and shown in the commonly owned copending patent application Ser. No. 708,227 filed Mar. 5, 1985 by Rudolf Maass for "Food processor with devices for cooling and soundproofing its motor", now abandoned and in the commonly owned copending patent application Ser. No. 708,261 filed Mar. 5, 1985 by Rudolf Maass et al. for "Food processor with a system for cooling its motor", now abandoned.

BACKGROUND OF THE INVENTION

The present invention relates to food processors and similar apparatus in general, and more particularly to improvements in food processors of the type wherein the output element of an electric motor drives a spindle which serves to rotate a selected tool in the interior of a bowl.

It is already known to provide the bottom wall of the detachable bowl in a food processor with an upwardly projecting tubular extension which surrounds the spindle and can receive an insulating sleeve serving to transmit torque from the spindle to a selected tool in the interior of the bowl. The tool is mounted directly on the sleeve and has an internal coupling element which mates with an external coupling element of the sleeve. Furthermore, the tool is provided with a cupped portion which overlies and surrounds the upper end of the sleeve. The cupped portion is provided at one axial end of the hub of the tool, and the other axial end of the hub is provided with a plate-like part which is used as a handle to facilitate insertion of the tool into the bowl or its detachment from the sleeve.

A drawback of the just discussed conventional food processors is that they must be furnished with rather bulky and complex tools, i.e., each tool must be provided with a cupped portion to properly overlie the upper end of the insulating sleeve as well as with a handle to facilitate its insertion into and its withdrawal from the bowl. This not only increases the cost of each tool but also reduces the useful volume of the bowl or necessitates the utilization of a relatively large bowl. Still further, a substantial number of such bulky tools take up excessive storage space. The situation is aggravated when the nature of the foodstuffs which are being processed or the nature of the dish which is being prepared by the operator of the food processor is such that several tools must be used one after the other. Last but not least, the cleaning of relatively large and bulky tools is a tedious and time-consuming task.

It is also known to provide a food processor with a safety device which prevents the operator from starting the motor when the tool in the bowl is accessible. This is intended to reduce the likelihood of accidents. Heretofore known safety devices which are utilized in food processors to prevent the operation of the motor when the tool in the bowl is accessible, i.e., when the cover is not properly applied to the main portion of the bowl, normally comprise numerous mechanical and electrical components cooperating in such a way that the electrical components permit starting of the motor only when the mechanical components lock the cover to the main portion of the bowl. A drawback of conventional safety devices is that they are rather bulky, complex and expensive. Moreover, they are prone to malfunction and their manipulation is not readily comprehensible without a perusal of the manual or in the absence of repeated demonstration.

OBJECTS AND SUMMARY OF THE INVENTION

An object of the invention is to provide a novel and improved food processor or an analogous apparatus which can utilize simple, compact and inexpensive tools.

Another object of the invention is to provide a food processor wherein a tool can be rapidly inserted into and withdrawn from the bowl even though it is not or need not be provided with a handle.

A further object of the invention is to provide novel and improved tools for use in a food processor.

An additional object of the invention is to provide a novel and improved device which allows for more convenient and safer manipulation of tools which are used in the bowl of a food processor to perform a dicing, slicing, grating, mixing, whipping and/or other operation.

Still another object of the invention is to provide a food processor which can utilize the improved tools.

An additional object of the invention is to provide novel and improved means for transmitting torque from the motor-driven spindle of a food processor to a selected tool.

Another object of the invention is to provide a food processor wherein the selected tool need not be mounted directly on an insulating member.

A further object of the invention is to provide a novel and improved insulating member which can be used in the torque transmitting connection between the motor of a food processor and a selected tool.

An additional object of the invention is to provide a food processor which can employ a relatively small bowl without reducing the ability of the apparatus to process large quantities of foodstuffs per unit of time.

A further object of the invention is to provide a novel and improved method of driving tools in the bowl of a food processor.

Another object of the invention is to provide the above outlined food processor with a novel and improved safety device which is simpler, more compact and less expensive than but at least as reliable as heretofore known safety devices which serve to reduce the likelihood of injury to an operator by the tool which rotates in the bowl of the food processor.

A further object of the invention is to provide a safety device which automatically prevents starting and/or changes in the speed of the motor when the selected tool in the interior of the bowl is accessible.

Another object of the invention is to provide a safety device whose operation can be readily comprehended by persons having little or no technical background and whose installation in a food processor contributes little to the bulk, cost and/or complexity of such apparatus.

A further object of the invention is to provide a novel and improved method of reducing the likelihood of injury to the operator of a food processor by the rotating material comminuting, dicing, slicing or analogous tool which is installed in the bowl and should be accessible only when the motor cannot be started.

The present invention is embodied in a food processor which comprises a housing, an electric motor in the housing, a bowl which is removably mounted in or on the housing and has a main or major portion including a bottom wall which is provided with a tubular extension in the interior of the bowl, a tool driving spindle which is rotatably mounted in the housing and is spacedly surrounded by the extension of the bottom wall, means for transmitting rotary motion from the motor to the spindle, a tubular adapter which is removably installed in the bowl and has at least one external coupling device serving to mate with the internal coupling device of a tool which is to be driven by the adapter, and means for transmitting torque from the spindle to the adapter. The torque transmitting means preferably comprises a sleeve-like member which is preferably made of an electrically insulating material, which is interposed between the spindle and the adapter and which is driven by the spindle. Such torque transmitting means further comprises an external coupling element which is provided on the sleeve-like member and an internal coupling element which is provided in the adapter and mates with the external coupling element. In accordance with a presently preferred embodiment of the invention, the coupling element and the coupling devices have complementary undulate circular outlines. Each such coupling element and coupling device can include keys or teeth alternating with splines or tooth spaces, and the keys or teeth of one of the coupling elements and coupling devices extend into the splines or tooth spaces of the other coupling element or coupling device and vice versa. The keys or teeth and the splines or tooth spaces are preferably parallel to the axis of the spindle. Furthermore, the keys or teeth of each of the coupling elements and of each of the coupling devices are preferably equidistant from each other, as considered in the circumferential direction of the spindle. This renders it possible to assemble such coupling element or coupling devices in any one of a plurality of different angular positions.

If the food processor is to be used with tools of the type having a hub and an inwardly extending annular portion at one axial end of the hub, the adapter is preferably provided with a substantially shoulder-like external stop for the annular end portion of the hub of a tool which is mounted thereon and whose internal coupling device mates with the external coupling device of the adapter. The latter can comprise a tubular portion which is provided with the aforementioned external coupling device and a shank which extends axially beyond the tubular portion and has a second external coupling device for engagement with the internal coupling device of a tool or with the internal coupling device in the hub of a tool carrier which is to hold and rotate a selected tool and is to receive torque from the shank of the adapter.

The carrier preferably constitutes a one-piece body of metallic or synthetic plastic material and is preferably provided with means for separably supporting and rotating a selected (mixing, blending, grating, slicing, dicing, whipping or analogous) tool. If the food processor is to be used with tools of the type having at least one substantially radially extending coupling protuberance, the carrier is provided with a marginal portion which is arranged to engage with and to retain the radial protuberance or protuberances of the tool so that the latter is then ready to receive torque from the adapter by way of the tool carrier. The tools which are to be mounted on and driven by the carrier are preferably provided with centrally disposed holes and collars surrounding the holes. The shank of the adapter preferably extends into the collar of the tool which has a central hole and which is mounted on the carrier while the internal coupling device of the carrier mates with the second external coupling device on the shank of the adapter.

The bowl is preferably provided with a cover which is removably mounted on the main portion or has or can have means for centering that end portion of the shank of the adapter which is remote from the bottom wall of the bowl. The end portion of the shank can be provided with a hole and the centering means can comprise a bearing pin which extends from the underside of the cover and is removably received in the hole. The shank can but need not comprise a cylindrical end portion which is remote from the bottom wall of the bowl.

The improved food processor can further comprise a safety device which serves to prevent the operation of the motor when the cover is removed from or is not properly mounted on the main or major portion of the bowl. Such safety device can comprise a toothed member on the cover and a gear which is rotatably mounted in the housing and mates with the toothed member when the cover is properly mounted on the main portion of the bowl. At such time, the toothed member maintains the gear in a predetermined angular position in which the gear permits operation of the motor. The housing is preferably provided with a slot or an otherwise configurated aperture, and the toothed member extends through the slot and meshes with the gear (which is preferably installed in the interior of the housing) when the cover is properly mounted on the main portion of the bowl.

The means for operating the motor can comprise an electric switch which is preferably detachably mounted in the housing and an actuating member (e.g., a knob) which is rotatably mounted in or on the housing and is operatively connected with the switch. The actuating member can be rotated relative to the housing, to thereby operate the motor by way of the switch, only in the predetermined angular position of the gear. The latter can comprise a toothed flange and a tubular extension having at least one slot which registers with a portion (e.g., a cylindrical skirt) of and permits rotation of the actuating member only in the predetermined angular position of the gear. The gear can further comprise a second tubular extension for a projection which is provided in or on the housing and extends into the second tubular extension to define an axis for rotation of the gear. The two extensions are preferably disposed at the opposite sides of the toothed flange and the latter can have a recess for a stop which is provided in or on the housing and extends into the recess to limit the extent of angular movement of the gear under the action of the toothed member.

The main portion of the bowl and the cover preferably include complementary retaining means and the retaining means of the cover engages the retaining means of the main portion when the toothed member maintains the gear in the predetermined angular position. At such time, the cover is locked to the main portion of the bowl. The retaining means of the main portion of the bowl can include a ledge which extends radially outwardly from the main portion and the retaining means of the cover can comprise a substantially L-shaped member which overlies the ledge when the toothed member maintains the gear in the predetermined angular position.

The novel features which are considered as characteristic of the invention are set forth in particular in the appended claims. The improved food processor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
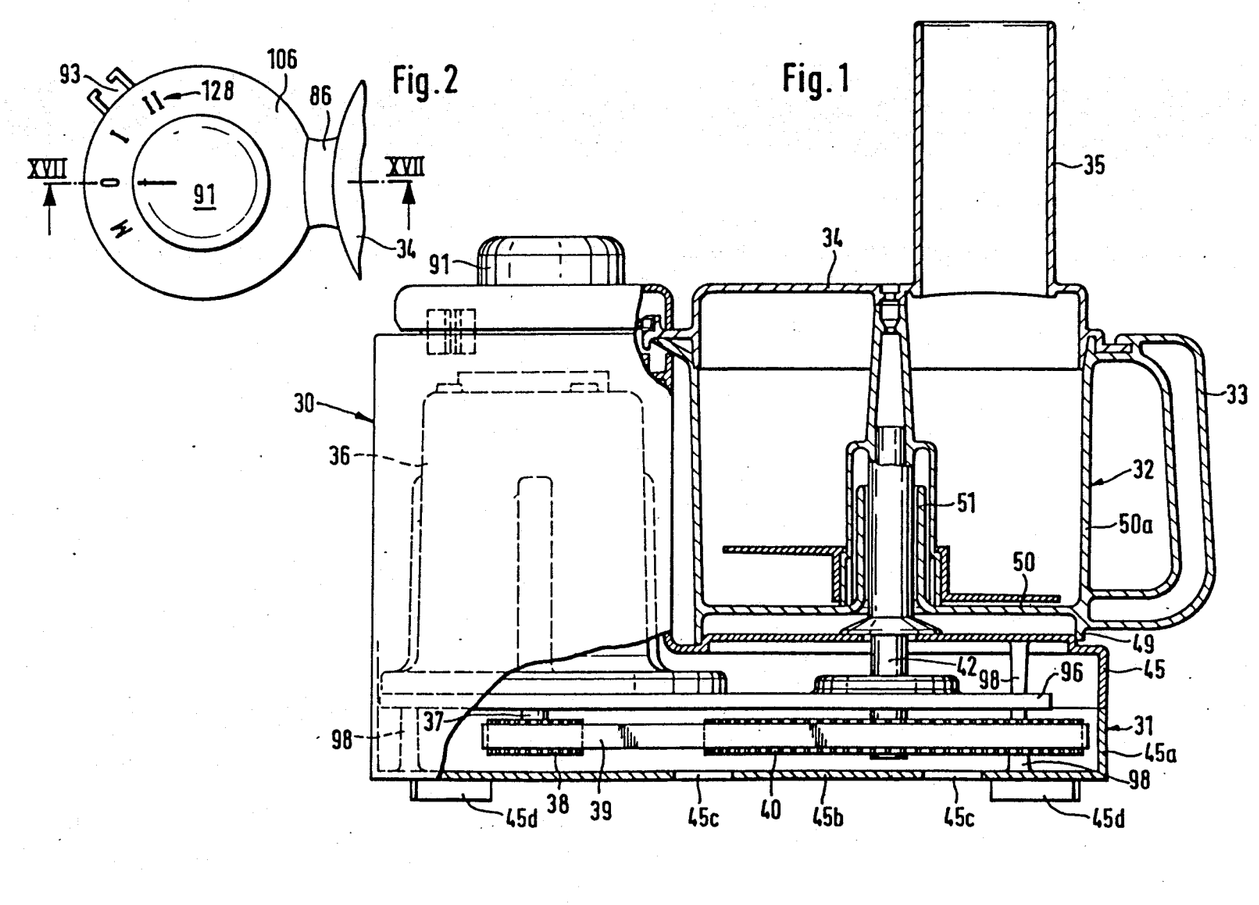
FIG. 1 is a partly elevational and partly vertical sectional view of a food processor which embodies the invention and wherein a rotary tool is disposed in the interior of a bowl which is detachably mounted on a base of the housing adjacent to that part of the housing which confines the motor.
FIG. 2 is a smaller-scale fragmentary plan view of the food processor.
Figure 17:
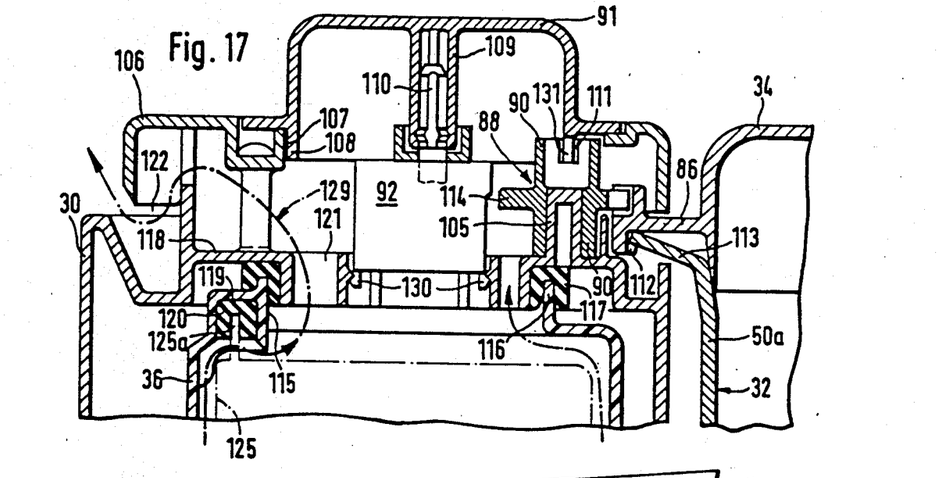
FIG. 17 is an enlarged fragmentary vertical sectional view of food processor as seen in the direction of arrows from the line XVII—XVII or FIG. 2.
Figure 18:
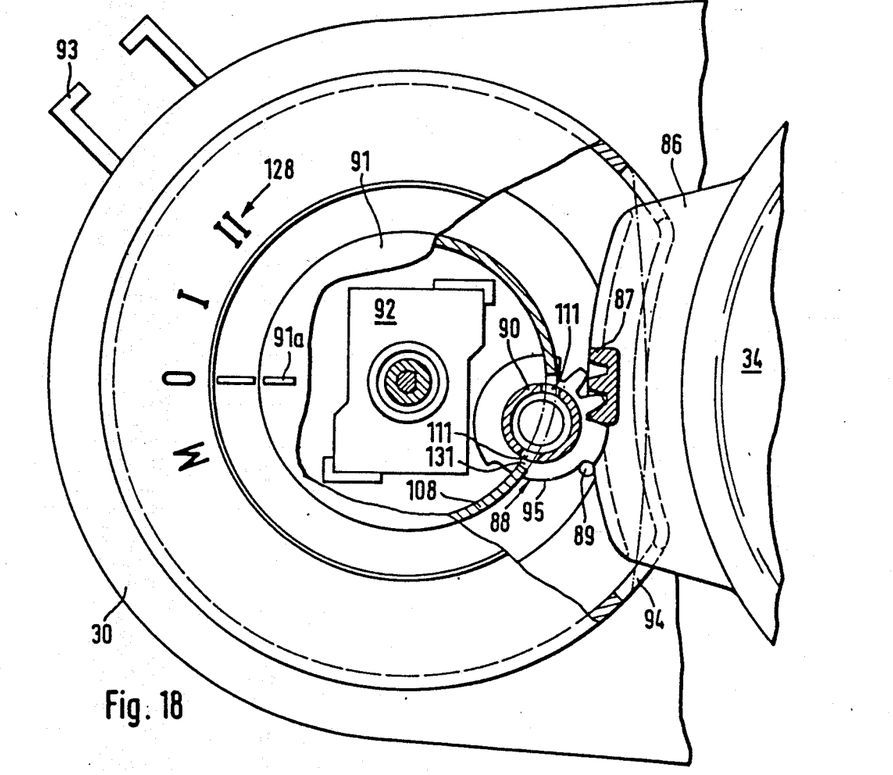
FIG. 18 is a plan view of the structure which is shown in FIG. 17, with portions of the housing and certain other parts partially broken away.

FIG. 1 shows a food processor which comprises a substantially L-shaped housing 30 for an electric motor 125 (shown in FIG. 17) and for a receptacle 32 in the form of a bowl which is separably mounted on and is supported by a horizontally extending hollow two-piece base or platform 31 of the housing. The means for operating the motor 125 include an electric switch 92 which is shown in FIGS. 17 and 18 as well as a rotary actuating member in the form of a knob 91 (shown in FIGS. 1, 2, 17 and 18) which can initiate starting or stoppage of the motor and can select its speed. Certain other conventional parts of the food processor (such as the cable which connects the switch 92 with a suitable source of electrical energy) have been omitted from the drawing for the sake of clarity. The bowl 32 is separably secured to the base 31 by a bayonet mount (not specifically shown) or by other suitable quick-release coupling means so that it cannot be accidentally detached from the housing 30. As can be seen in FIG. 1, the bowl 32 comprises an integral handle 33 and a removable cover 34 which has an upright material feeding tube 35 for introduction of partially comminuted or non-comminuted foodstuffs into the interior of the bowl and into the range of a selected tool which is driven by the output shaft 37 of the motor 125 through the medium of motion transmitting means in the interior of the hollow base 31. The illustrated motion transmitting or torque transmitting means comprises a relatively small rotary member 38 in the form of a toothed pulley on the output shaft 37, a relatively large rotary member 40 in the form of a toothed pulley which transmits torque to an upright tool driving spindle or shaft 42, and an endless flexible element in the form of a toothed belt 39 which is trained over the pulleys 38 and 40. The spindle 42 is rotatably journalled in the housing 30 and extends upwardly beyond the base 31 and into the interior of the bowl 32. The cover 34 is detachably secured to the main or major portion 50, 50a of the bowl 32 by a bayonet mount or in any other suitable way so as to prevent accidental separation when the food processor is in actual use. The properly affixed cover 34 can further perform an additional function, namely of permitting manipulation of the knob 91 (i.e., starting and stoppage of the motor 125) only when the bowl 32 is properly mounted on the base 31 and the cover 34 is properly secured to the main or major portion 50, 50a of the bowl as well as to that portion of the housing 30 which surrounds the motor 125.

The motor 125 is confined in a substantially tubular upright enclosure or shroud 36 which is mounted on a plate-like support 96. The latter is installed in the base 31 of the housing 30 and includes a first portion below the bowl 32 and a second portion below the motor 125 and shroud 36. As can be seen in FIG. 1, the support 96 is installed between one or more downwardly extending centering elements or legs 98 which are integral with the upper part 45 of the base 31 and one or more upwardly extending centering elements or legs 98 which are integral with the lower part 45a of the base. The support 96, the motor 125 and the shroud 36 can be lifted above the lower part 45a of the base 31 upon detachment of the upper part 45 from the part 45a. The support 96 has a bearing 97 for the spindle 42.

Figure 3:
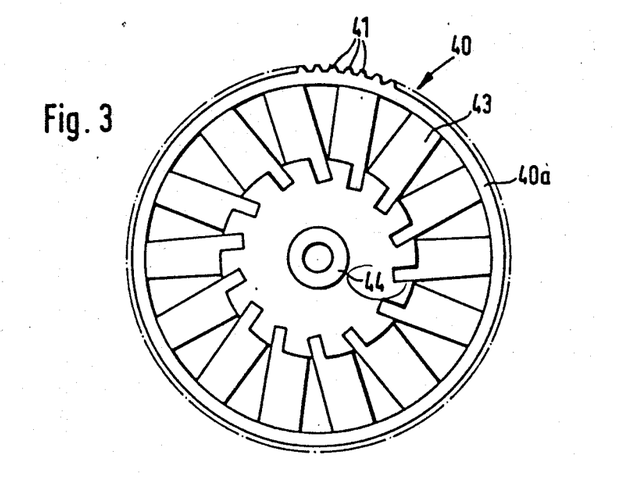
FIG. 3 is a plan view of a rotary air circulating device which can be used in the food processor of FIGS. 1 and 2.

The larger-diameter toothed pulley 40 of the motion transmitting means between the output shaft 37 of the motor 125 and the spindle 42 constitutes an air circulating device, preferably a fan wheel or impeller of the type shown in FIG. 3. The rim 40a of the fan wheel 40 is provided with an annulus of external teeth 41 (see FIGS. 3 and 4) which mate with the teeth of the belt 39, and the hub 44 of the fan wheel 40 is non-rotatably mounted on the lower end portion of the spindle 42 by means of a nut 99 and a washer 100. The vanes or blades 43 of the fan wheel 40 are mounted at the upper side of the disc-shaped flange 40b within the confines of the rim 40a, i.e., the vanes do not extend upwardly and beyond the level of the upper end face of the rim 40a. The height of the base 31 can be reduced if the hub 44 of the fan wheel 40 is provided with a polygonal socket for reception of the washer 100 and nut 99. Other types of means for non-rotatably affixing the hub 44 to the spindle 42 can be used with equal or similar advantage. The inner end portions of the vanes 43 extend to and are connected to (preferably integral with) the hub 44 and/or the outer end portions of the vanes 43 extend to and are connected to (preferably integral with) the rim 40a.

The illustrated vanes 43 can be replaced with other types of vanes, e.g., with a set of vanes which extend radially or substantially radially from the hub 44 of the fan wheel 40. Such vanes may but need not be integral with the hub 44, flange 40b and/or rim 40a of the fan wheel. It is further possible to provide vanes which extend beyond the upper or below the lower end face of the rim 40a provided that they do not generate excessive noise.

The bottom wall 45b of the lower part 45a of the base 31 is provided with one or more openings 45c which admit cool atmospheric air into the base 31 and into the range of vanes 43 on the flange 40b of the fan wheel 40. The legs 45d at the underside of the bottom wall 45b ensure that the opening or openings 45c cannot be sealed by the top surface of a table or the like which supports the improved food processor, i.e., that the fan wheel 40 can circulate requisite quantities of fresh air which flows along the path defined by the base 31 and into the air admitting lower opening 115a (FIG. 19) of the shroud 36 when the motor 125 is on, i.e., when the motor requires cooling.

The base 31 can be provided with internal guides or deflectors (not specifically shown) which direct one or more air streams from the upper side of the fan wheel 40 toward the opening 115a in the lower end portion of the shroud 36. Such guide means can constitute ribs which are integral with and are disposed at the underside of the top wall 46 of the upper part 45 of the base 31. However, it is equally possible to install in the base 31 one or more separately produced tubular conduits which direct air from the vanes 43 toward the opening 115a of the shroud 36.

The means (e.g., a set of screws or bolts) for separably coupling the parts 45 and 45a of the base 31 to each other is not specifically shown in the drawing. The legs 45d of the lower part 45a of the base 31 rest on a suitable supporting surface, e.g., on the surface of a table or on the surface of a counter top in the kitchen. The top wall 46 of the upper part 45 of the base 31 has an opening 47 which is bounded by a smooth surface and through which the spindle 42 extends upwardly into the interior of the bowl 32. The top wall 46 is further formed with an annular shoulder 48 which is radially offset from the upright tubular lower portion of the part 45. The bottom wall 50 of the bowl 32 has a set of integral downardly extending projections 49 which are in engagement with the external surface of the shoulder 48 when the bowl is properly mounted on the upper part 45 of the base 31. The projections 49 are spaced apart from each other, as considered in the circumferential direction of the shoulder 48, and cooperate with the latter to hold the bowl 32 against lateral shifting with reference to the base 31. The lower end faces of the projections 49 are separated from the upper side of the adjacent portion of the upper part 45 by a gap 126 which establishes communication between the surrounding atmosphere and a compartment 127 between the top wall 46 of the upper part 45 and the bottom wall 50 of the bowl 32 when the latter is properly mounted on the base 31. The spaces between neighboring projections 49 of the bottom wall 50 allow for evacuation of liquid media from the compartment 127.

Figures 4, 5, 6:
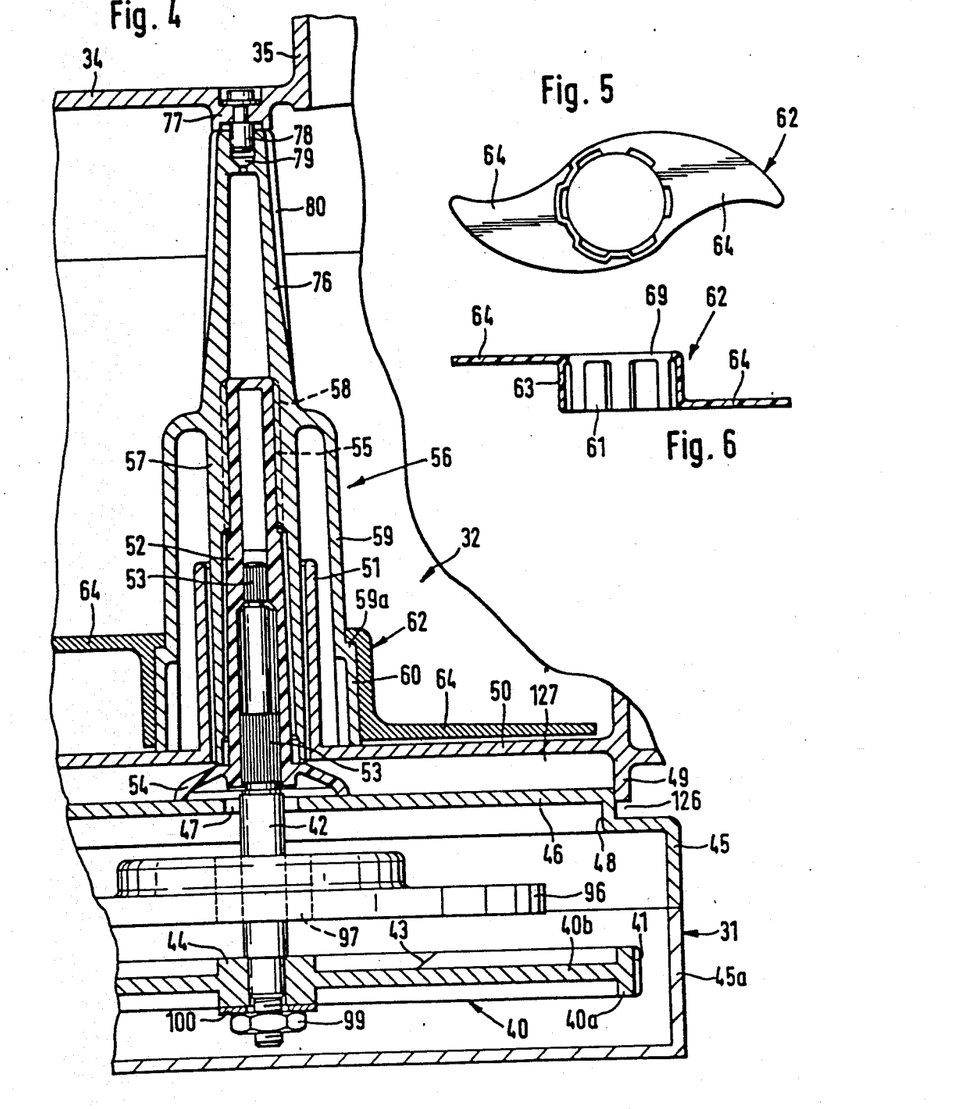
FIG. 4 is an enlarged vertical sectional view of a detail in the food processor of FIGS. 1 and 2.
FIG. 5 is a smaller-scale plan view of a rotary kneading tool which can be used in the food processor of FIGS. 1, 2 and 4.
FIG. 6 is an axial sectional view of the kneading tool.

The bottom wall 50 of the bowl 32 has a sleeve-like extension 51 which extends upwardly and away from the top wall 46 and spacedly surrounds the spindle 42. As can be seen in FIG. 4, the extension 51 projects upwardly well into the interior of the bowl 32. The spindle 42 comprises several axially staggered sections having different diameters, and the two uppermost sections 53 of the spindle have axially parallel external splines alternating with keys or teeth and serving to transmit torque to the adjacent portions of an upright one-piece sleeve-like insulating member 52 which is made of a suitable synthetic plastic material. The upper end of the insulating member 52 is closed and its lower end constitutes a disc-shaped leg 54 which is located in the central portion of the compartment 127. The leg 54 serves as a means for propelling any liquid media which happen to flow from the interior of the bowl 32 between the external surface of the insulating member 52 and the internal surface of the extension 51. Such media are propelled into the compartment 127 and radially outwardly toward the spaces between the projections 49 of the bottom wall 50 so that they can escape from the compartment 127 via gap 126.

The insulating member 52 is provided with an axially parallel external coupling element 55 which mates with the complementary internal coupling element 58 of an elongated upright hollow adapter 56. The coupling elements 55 and 58 have undulate outlines (see the outline of the coupling element 83 in FIG. 12) or the outline of a spur gear. The axially parallel keys of the coupling element 55 extend into and are snugly received in the axially parallel splines of the coupling element 58 and vice versa. This ensures that the insulating member 52 can transmit torque to the adapter 56 in response to rotation of the spindle 42. The torque transmitting surfaces of the keys and the adjacent surfaces in the respective splines of the coupling elements 55 and 58 extend substantially radially of the axis of the spindle 42.

The adapter 56 comprises an inner tubular portion 57 which is provided with the coupling element 58 and whose lower end is open and rests on the leg 54 of the insulating member 52. The adapter 56 further comprises an outer tubular portion 59 which spacedly surrounds the inner tubular portion 57 so that the tubular portions 57, 59 define an annular space for the extension 51 of the bottom wall 50 of the bowl 32. The upper end of the outer tubular portion 59 is closed and the open lower end of this tubular portion rests on the bottom wall 50 and is provided with an external coupling element or device 60 mating with the complementary internal coupling element or device 61 (see particularly FIG. 6) of a rotary kneading tool 62 which is non-rotatably and separably mounted on the adapter 56 and is located in the interior of and close to the bottom wall 50 of the bowl 32. Each of the coupling elements or devices 60 and 61 comprises a set of equidistant axially parallel teeth or keys alternating with tooth spaces or splines whereby the teeth of the coupling element 60 extend into the tooth spaces of the coupling element 61 and vice versa. Each of the coupling elements 60, 61 has a generally circular but undulate outline.

All of the heretofore described coupling elements 55, 58, 60, 61 as well as the coupling elements of the sections 53 of the spindle 42 have axially parallel keys or teeth alternating with axially parallel splines or tooth spaces. However, it is equally within the purview of the invention to provide such coupling elements with spiral keys and splines; all that counts is to ensure that the spindle 42 can drive the insulating member 52, that the insulating member 52 can transmit torque to the adapter 56 and that the adapter 56 can transmit torque to the kneading tool 62 or to any other tool whose internal coupling element is brought into torque receiving engagement with the external coupling element 60 on the outer tubular portion 59 of the adapter 56. The tool 62 constitutes but one of a variety of tools which can be mounted on and driven by the outer tubular portion 59 of the adapter 56. The adapter 56 and the tool thereon are accessible upon detachment of the cover 34 from the major portion 50, 50a of the bowl 32, and the adapter can be slipped off the insulating member 52 together with the tool 62 to be replaced with an adapter which carries a different tool, or the adapter can remain in the bowl and the user merely replaces the illustrated tool 62 with a different tool.

The kneading tool 62 of FIGS. 4, 5 and 6 comprises a hub 63 which is formed with the internal coupling element 61 and which further comprises an inwardly extending annular upper end portion 69 which can come to rest on an annular shoulder-like stop 59a of the outer tubular portion 59 to maintain the tool 62 at an optimum distance from and above the bottom wall 50 of the bowl 32. The hub 63 carries two identical arcuate wings 64 having pointed tips and being disposed at two different levels. Thus, and as can be seen in FIG. 4, one of the wings 64 is closely or immediately adjacent to the upper side of the bottom wall 50 and the other wing 64 is spaced apart from the bottom wall 50 so as to enable the tool 62 to perform a more satisfactory kneading action. The entire tool 62 is preferably made of a single piece of suitable metallic or synthetic plastic material.

Figure 7:
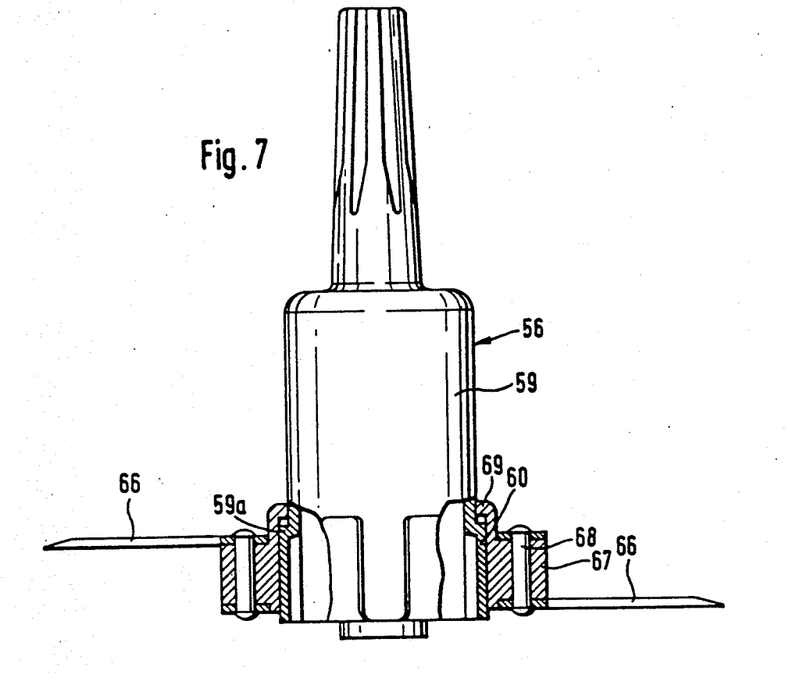
FIG. 7 is a partly elevational and partly sectional view of a removable adapter which can be used in the food processor of FIGS. 1, 2 and 4, and further showing in an axial sectional view a severing tool which is separably coupled to the adapter.
Figure 8:
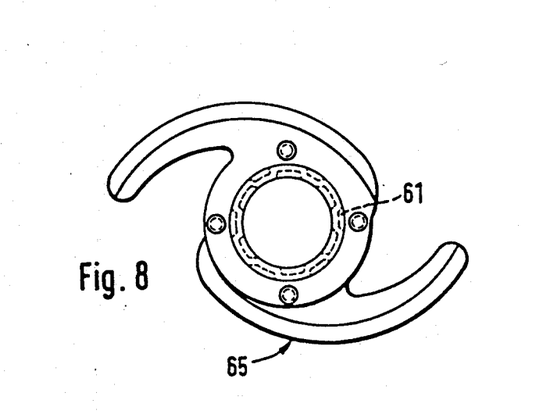
FIG. 8 is a smaller-scale plan view of the severing tool.

FIGS. 7 and 8 show a second tool 65 which is a cutting implement and has two identical arcuate sickle-shaped blades 66 secured to a hub 67 by rivets 68 and being disposed at two different levels, the same as the wings 64 of the kneading tool 62. The hub 67 has an annular upper end portion 69 which cooperates with the shoulder-like stop 59a on the outer tubular portion 59 of the adapter 56. The cutting edges of the blades 66 can be sharpened (e.g., by grinding) at required intervals in a manner not forming part of the invention. The hub 67 is further provided with an internal coupling element or device 61 which is identical with the similarly referenced coupling element or device of the hub 63 of the kneading tool 62 and cooperates with the external coupling element or device 60 of the tubular portion 59 to orbit the blades 66 about the axis of the spindle 42 when the motor 125 is on. The axial length of the hub 67 and the position of its annular upper end portion 69 are preferably selected in such a way that one of the blades 66 is closely adjacent to the upper side of the bottom wall 50 when the tool 65 is installed in the interior of the bowl 32 in lieu of the kneading tool 62.

Figure 9:
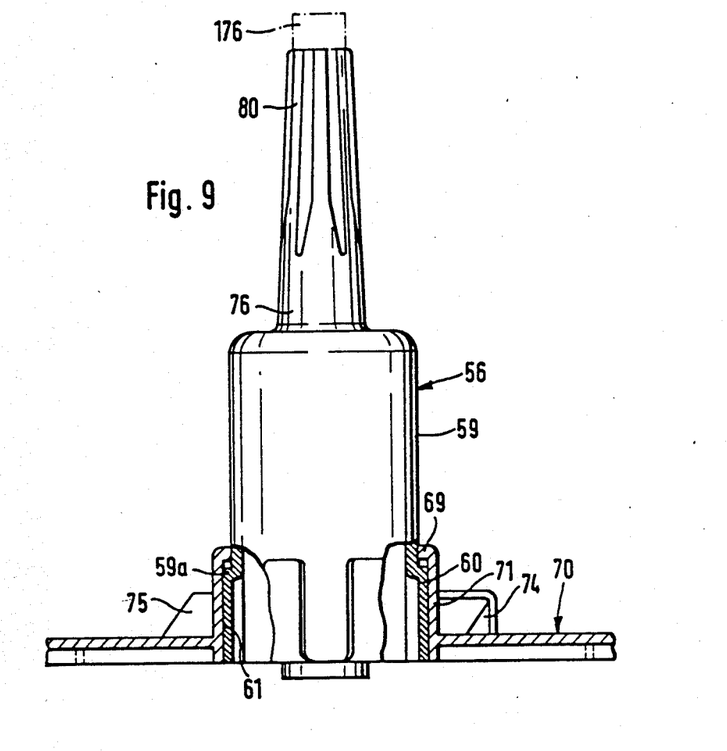
FIG. 9 shows the adapter of FIG. 7 and a portion of a whipping tool which is separably coupled to the adapter.
Figure 10:
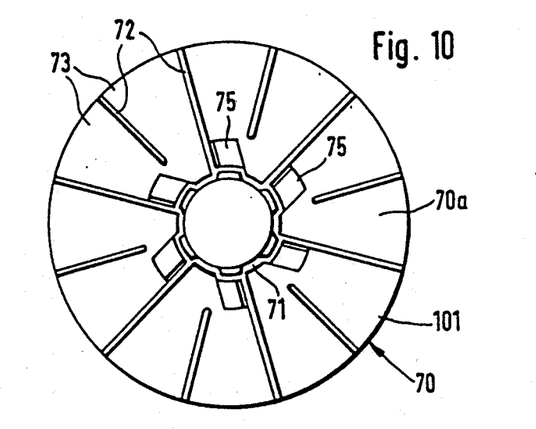
FIG. 10 a smaller-scale plan view of the whipping tool.

FIGS. 9 and 10 show a whipping tool or implement 70 which can be mounted on the outer tubular portion 59 of the adapter 56 in lieu of the tool 62 or 65 when the food processor is used for the whipping of cream, egg whites, mayonnaise or the like. The tool 70 includes a disc 70a which extends radially outwardly from a substantially cylindrical hub 71 having an annular upper end portion 69 serving to cooperate with the shoulder-like stop 59a of the adapter 56 to maintain the disc 70a at an optimum distance from the upper side of the bottom wall 50. The tool 70 is preferably designed to rest on the bottom wall 50 and, therefore, the upper end portion 69 is remote from the stop 59a when the adapter 56 of FIG. 9 is installed in the bowl 32. That side of the disc 70a which faces the bottom wall 50 of the bowl 32 is formed with a star-shaped array of partitions in the form of radially extending ribs 72 including longer ribs which extend all the way to the hub 71 and alternate with shorter ribs terminating radially outwardly of the hub. The ribs 72 flank radially outwardly extending and radially outwardly diverging air channels 73 which are bounded from below by the bottom wall 50 when the adapter 56 and the tool 70 are properly mounted in the bowl 32. In other words, at least the longer ribs 72 rest on the bottom wall 50 when the tool 70 is in use. The radially innermost portions of the air channels 73 communicate with air admitting openings 74 whose upper ends are overlapped by pocket-like walls 75 which curve upwardly and away from the upper side of the disc 70a. The outlets 101 of the channels 73 are disposed at the periphery of the disc 70a. Each of the openings 74 admits air into two of the neighboring air channels 73.

The purpose of the inwardly extending annular end portion 69 of the hub 71 is to ensure that the tool 70 is lifted by the stop 59a of the adapter 56 when the latter is lifted out of the bowl 32 upon detachment of the cover 34.

The whipping tool 70 not only circulates the foodstuff or foodstuffs (e.g., mayonnaise, egg whites or cream) which are introduced into the bowl 32 (either by way of the tube 35 or prior to attachment of the cover 34) but it also serves to forcibly introduce into the material in the bowl 32 finely distributed minute bubbles of air which is admitted via openings 74 and flows radially outwardly through the channels 73 to be discharged into the material via outlets 101 close to the tubular circumferential wall 50a (FIG. 1) of the bowl 32 at the upper side of the bottom wall 50. The disc 70a propels the material toward the corner region between the bottom wall 50 and the circumferential wall 50a by centrifugal force, and the thus propelled material forms a ring-shaped mass which receives minute bubbles of air via outlets 101. It has been found that the tool 70 can whip large quantities of cream or the like within surprisingly short intervals of time. The features of the tool 70 are fully disclosed and claimed in the aforementioned commonly owned copending patent application Ser. No. 645,439.

Figure 11:
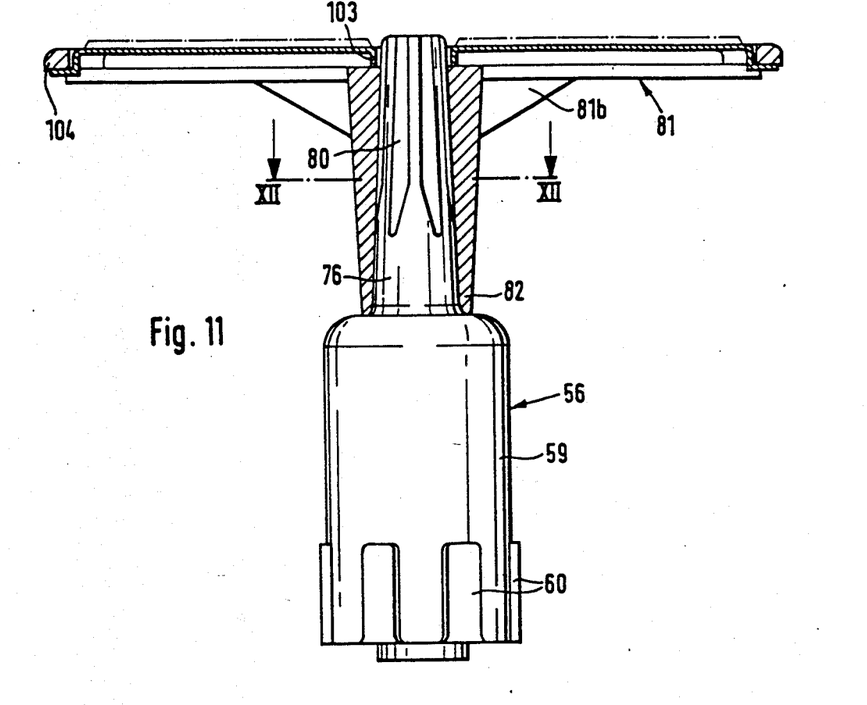
FIG. 11 shows the adapter of FIG. 7 and a tool carrier which is separably coupled to an upwardly extending shank of the adapter.

The adapter 56 can transmit torque to a tool by way of its outer tubular portion 59 as well as by way of a shank 76 which extends upwardly beyond the tubular portions 57, 59 and is provided with an external coupling element or device 80 (see particularly FIGS. 4 and 11). The coupling element 80 can transmit torque directly to the internal coupling element or device 60 of a tool or to the internal coupling element or device 83 of a tool carrier 81 (shown in FIGS. 11, 12, 13 and 14) which, in turn, can transmit torque to any one of a plurality of different tools. A tool will be mounted directly on the shank 76 of the adapter 56 or the shank 76 will transmit torque to a tool which is mounted on the carrier 81 if the tool is to act upon the foodstuff or foodstuffs at a level close to the underside of the cover 34. For example, a tool on the shank 76 or on the carrier 81 can be used to slice foodstuffs which are admitted into the bowl 62 via material feeding tube 35 of the cover 34. It is even possible to mount on the adapter 56 several tools including a tool which receives torque from the coupling element 60 and a tool which receives torque from the coupling element 80 (either directly or through the medium of the carrier 81). The shank 76 or the carrier 81 can support a chopping, shredding, pureeing, stirring, whipping, folding, blending, kneading, dicing, slicing, mixing or grating tool. Such tool or tools can comminute cheese, potatoes, carrots, meats and a host of other foodstuffs.

Figure 12:
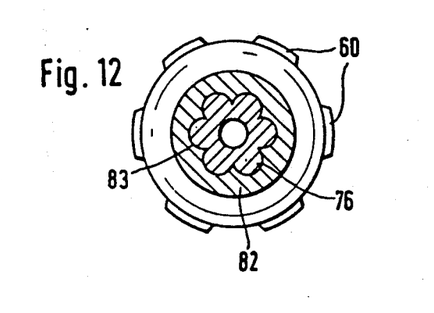
FIG. 12 is a horizontal sectional view as seen in the direction of arrows from the line XII—XII in FIG. 11.
Figure 13:
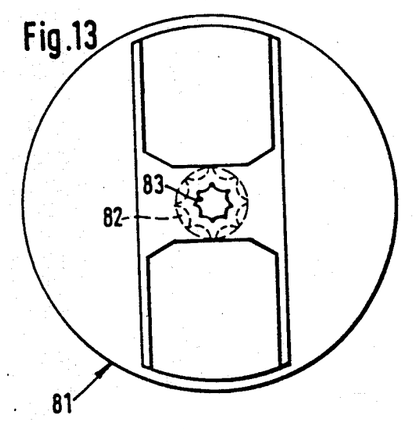
FIG. 13 is a smaller-scale plan view of the tool carrier which is shown in FIG. 11.
Figure 14:
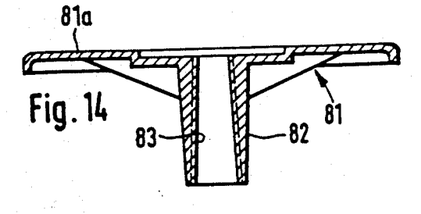
FIG. 14 is an axial sectional view of the tool carrier which shown in FIG. 13.

The diameter of the shank 76 is less than that of the outer tubular portion 59 of the adapter 56 which means that a tool which is to be driven directly by the shank 76 must have an internal coupling element whose radius is smaller than that of the coupling elements 61 of the tools 62, 65 and 70. The coupling element 83 in the hub 82 of the carrier 81 mates with the coupling element 80 of the shank 76 when the carrier 81 is mounted on the adapter 56 in a manner as shown in FIG. 11. As can be seen in FIG. 12, the coupling elements 80 and 83 include alternating axially parallel keys or teeth and splines or tooth spaces and each of these coupling elements has a generally circular but undulate outline.

The upper end portion of the shank 76 is preferably coupled to and stabilized and centered by the cover 34 of the bowl 32, e.g., in a manner as shown in FIG. 4. The underside of the cover 34 is formed with an integral female bearing portion 77 for a bearing pin 78 which extends into a bore or hole 79 in the top end face of the shank 76. This ensures that the adapter 56 cannot wobble when the cover 34 is in place and the motor 125 is on. The exposed portion of the bearing pin 78 is relatively short so that the cover 34 can be readily detached from the shank 76 and from the major portion 50, 50a of the bowl 32. On the other hand, the pin 78 automatically enters the hole 79 in the upper end face of the shank 76 when the cover 34 is returned to the position which is shown in FIG. 4.

FIG. 9 shows that the axial length of the coupling element 80 on the shank 76 deviates from the axial length of the coupling element 60 on the outer tubular portion 59 of the adapter 56. Also, the configuration of the coupling element 60 may but need not be identical with that of the coupling element 80. The latter tapers upwardly and away from the outer tubular portion 59 of the adapter 56.

The tool carrier 81 further comprises a disc-shaped main portion 81a which can be provided with reinforcing ribs 81b extending from its underside and merging into the hub 82. The lower end face of the hub 83 can extend all the way to and then rests on the upper end face of the outer tubular portion 59 when the carrier 81 is properly mounted on the shank 76. The coupling element 80 of the shank 76 extends all the way to the upper end face of the shank; however, it is equally within the purview of the invention to modify the shank 76 so that its coupling element 80 terminates short of its upper end face (i.e., short of the upper end of the hole 79). The upper end portion of the shank 76 then preferably constitutes a cylinder having a smooth peripheral surface and a constant diameter from its upper end face to the upper end of the coupling element 80. The diameter of such cylinder preferably equals or approximates the minimum inner diameter of the hub 82 of the carrier 81, i.e., the minimum diameter of the upper end portion of the coupling element 80 therebelow. The shoulder between the just discussed cylinder of the shank 76 and the coupling element 80 below such cylinder can serve as a stop for a suitable abutment of the carrier 81 or for a tool which is mounted directly on the shank 76 so as to maintain the tool at an optimum distance from the lower end of the material feeding tube 35. For example, tools having different axial lengths can be provided with abutments at different distances from their lower axial ends to thus ensure that the wings, blades and/or otherwise configurated material influencing parts of such tools will be disposed at a desired distance from the underside of the cover 34, from the upper side of the bottom wall 50 and from the lower end of the tube 35.

The lower end face of the hub 82 of the carrier 81 need not necessarily rest on the upper end of the outer tubular portion 59 of the adapter 56. This renders it possible to maintain the carrier 81 at a level other than that which is shown in FIG. 11 by the simple expedient of ensuring that the coupling element 80 of the shank 76 maintains the hub 82 at an optimum distance from the tubular portion 59. The coupling elements 80 and 83 can be provided with cooperating shoulders or otherwise configurated stops to maintain the carrier 81 at a selected optimum level above the bottom wall 50 of the bowl 32.

Figures 15, 16:
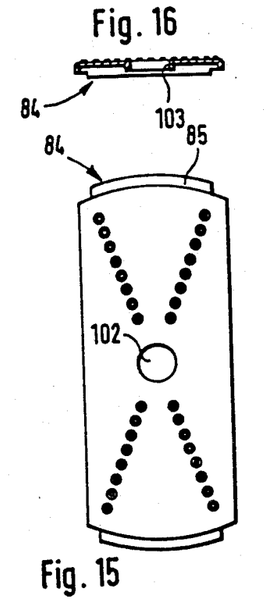
FIG. 15 is a plan view of a grating tool which can be separably mounted on and driven by the carrier of FIGS. 11 to 14.
FIG. 16 is an axial sectional view of the grating tool.

FIGS. 15 and 16 show a disc-shaped grating tool 84 (e.g., for the grating of cheese) which can be detachably mounted on the carrier 81 of FIGS. 11 to 14. The main portion of the tool 84 has a substantially rectangular outline (see FIG. 15) and its shorter sides are provided with radial protuberances 85 which are bent out of the general plane of the tool and underlie the marginal portion 104 of the carrier 81 (see FIG. 11) when the latter is properly assembled with the tool 84. The marginal portion 104 constitutes a means for separably supporting and rotating the tool 84. The tool 84 has a centrally located hole 102 which is surrounded by a collar 103 extending downwardly toward the outer tubular portion 59 of the adapter 56. The upper end portion of the shank 76 extends into and through the hole 102 (see FIG. 11) when the carrier 81 is properly mounted on the shank 76 and the tool 84 is properly mounted on the carrier. It is possible to provide each of a series of different tools with collars of different axial length so as to ensure that the major portion of each such tool is located at a different distance from the bottom wall 50 of the bowl 32. The tool 84 acts upon the foodstuffs which are admitted into the bowl 32 via material feeding tube 35. Another tool can be used to slice, dice or otherwise treat the admitted foodstuffs.

The improved food processor is further provided with a safety device the details of which are shown in FIGS. 17 and 18 and which ensures that the knob 91 can be rotated to adjust the switch 92 (i.e., that the motor 125 can be operated) only when the bowl 32 is properly mounted on the base 31 and the cover 34 is properly mounted on the main portion 50, 50a of the bowl. The motor 125 can be started only when the cover 34 is in place, i.e., when the tool which is installed in the bowl 32 cannot be reached and hence cannot injure the operator.

The cover 34 comprises a toothed radial extension or member 86 having a convex edge face provided with a set of teeth 87. The extension 86 resembles a gear segment and its teeth 87 can be moved into mesh with the teeth of a gear 88 which is rotatably mounted on a projection 105 constituting a bearing and forming an integral part of a horizontal wall or partition 118 of the housing 30 in the region of the upper end of the shroud 36. The housing 30 further carries a pin-shaped stop 89 which extends into a peripheral recess or notch 95 of the gear 88 and limits the extent to which the gear 88 can turn about the axis of the projection 105. The gear 88 includes a substantially centrally located flange 114 which is formed with a set of teeth as well as with the aforementioned recess 95 for the stop 89. This gear further includes two tubular extensions 90 one of which extends upwardly and the other of which extends downwardly from the flange 114 and surrounds the projection 105.

The housing 30 further comprises an additional wall 106 which constitutes a detachable lid and is located at a level above the wall or partition 118. The lid or wall 106 is formed with a central opening 107 for the lowermost part of the cylindrical marginal portion or skirt 108 of the rotary knob 91. The underside of the top wall of the knob 91 has a downwardly extending hollow stud 109 bounded by a polygonal surface which engages the complementary polygonal external surface of a motion transmitting pin 110 for the switch 92. The exact details of the switch 92 form no part of the present invention. As can be seen by indicia 128 which are applied to the upper side of the lid 106 adjacent to the knob 91, the switch 92 can be actuated to arrest the motor 125 or to cause the motor to operate at either one of two different speeds. The electrical connections between the switch 92 and the motor 125 within the confines of the shroud 36 are not shown in FIGS. 17 and 18. The casing of the switch 92 is provided with male detent means 130 in the form of elastic prongs which can releasably engage complementary female detent means on the partition 118 of the housing 30 i.e., the switch 92 can be readily detached from the housing in order to allow for inspection, repair or replacement.

The upper tubular extension 90 of the gear 88 has two slots 111 together defining an arcuate passage for the marginal portion or skirt 108 of the knob 91. The center of curvature of the passage which includes the two slots 111 is located on the axis of the cylindrical marginal portion 108. The latter has an arcuate cutout 131 which receives the upper tubular extension 90 of the gear 88 when the angular position of the knob 91 is such that the motor 125 is arrested, i.e., when the motion transmitting pin 110 assumes the zero position shown in FIG. 18. The angular position of the knob 91 can be changed to start the motor 125 only when the upper tubular extension 90 of the gear 88 assumes the angular position of FIG. 18 so that the marginal portion 108 of the knob 91 can enter the slots 111. The gear 88 is held in such angular position by the teeth 87 of the segment 86 when the latter is properly affixed to the major portion 50, 50a of the bowl 32 and its radial extension 86 is received in a slot 94 of the adjacent portion of the housing 30. Thus, the extension 86 is partially received in the interior of the housing 30 when its teeth 87 mate with the teeth of the gear 88 and hold the gear in the angular position of FIG. 18 in which the stop 89 is received in one end portion of the recess 95 of the flange 114.

The mode of operation of the safety device of FIGS. 17 and 18 is as follows:

The bowl 32 is placed onto the upper portion 45 of the base 31 in a manner as shown in FIGS. 1 and 4. The cover 34 is then turned about the common axis of the spindle 42 and adapter 56 so that its radial extension 86 enters the slot 94 of the housing 30 and the teeth 87 of the extension 86 move into mesh with the teeth of the gear 88 whereby the latter is rotated about the axis of the projection 105 until the recess 95 assumes the angular position of FIG. 18 and further clockwise rotation of the gear 88 is prevented by the stop 89. At such time, a downwardly extending first retaining member in the form of a L-shaped member or claw 112 on the extension 86 engages a second retaining member in the form of a radial ledge 113 on the main portion 50, 50a of the bowl 32 so that the cover 34 is held against lifting off the wall 50a. This can be seen in FIG. 17 As shown in FIG. 18, the flange 114 of the gear 88 can be provided with a relatively small number of teeth as long as the number of such teeth suffices to ensure that the extension or gear segment 86 can change the angular position of the gear 88 in response to angular movement of the cover 34 to the position of FIG. 18 in which the stop 89 extends into one end portion of the arcuate recess 95 and the slots 111 in the upper tubular extension 90 of the gear 88 are aligned with the marginal portion 108 of the knob 91, i.e., that the knob 91 can turn about its axis in order to start the motor 125 via switch 92. The knob 91 has a marker 91a which enables the operator to ascertain the angular position of the knob and motion transmitting pin 110 and hence the selected condition of the motor 125. As mentioned above, the knob 91 can be rotated (because the slots 111 assume the angular positions of FIG. 18) only when the cover 34 is attached to the major portion 50, 50a of the bowl 32 and to the housing 30 so that it cannot be lifted and afford access to the tool in the interior of the bowl.

The external surface of that portion of the housing 30 which surrounds the shroud 36 for the motor 125 is provided with a suitable clamp 93 for the electric cable which connects the switch 92 with a source of electrical energy.

The structure which is shown in FIGS. 17 and 18 can be provided with a torsion spring or the like for yieldably biasing the gear 88 to an angular position in which the stop 89 is received in the other end of the recess 95. This ensures that the gear 88 is always in an optimum angular position for engagement with the teeth 87 of the extension 86 when the latter is inserted through the slot 94 of the housing 30 and is rotated in a direction to move the gear 88 to the angular position of FIG. 18 in which the slots 111 are in register with the marginal portion 106 of the knob 91.

Figure 19:
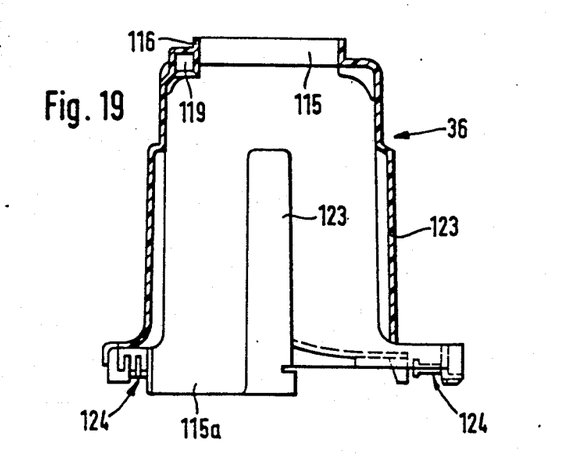
FIG. 19 is a central vertical sectional view of a shroud which is utilized in the food processor of FIGS. 1, 2, 4, 17 and 18.
Figure 20:
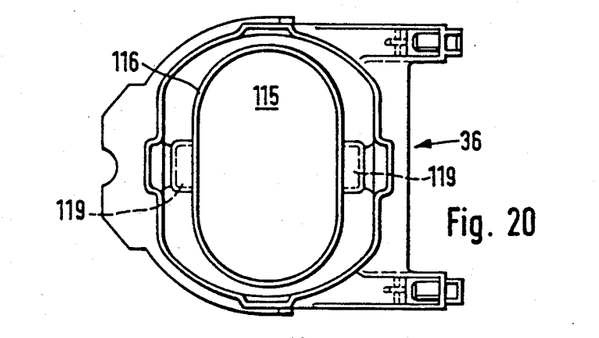
FIG. 20 is a plan view of the shroud which is shown in FIG. 19.

FIGS. 19 and 20 show the presently preferred construction of the shroud 36 for the motor 125. The shroud performs a soundproofing function and it also ensures a more satisfactory cooling of the motor by air which is circulated by the fan wheel 40. As can be seen in FIG. 19, the shroud 36 is a one-piece tubular body having the aforementioned air admitting opening 115a at its lower end and an oval air discharging opening 115 at its upper end. The base 31 of the housing 30 defines a path for the flow of cool air from the fan wheel 40 to the lower opening 115a, and such air then flows between the internal surface of the shroud 36 and the preferably closely adjacent external surface of the motor 125 to ensure satisfactory exchange of heat between the circulating air and the motor. The heated air issues from the shroud 36 through the opening 115 to pass through one or more apertures 121 in the partition or wall 118 (see FIG. 17) and thence through one or more clearances 122 defined by the top wall or lid 106 of the housing 30. The direction of flow of air from the opening 115 of the shroud 36 to the surrounding atmosphere (via aperture or apertures 121 and clearance or clearances 122) is indicated in FIG. 17 by a phantom-line arrow 129.

The shroud 36 can constitute a one-piece body of synthetic plastic material which is provided with integral axially parallel reinforcing ribs 123 and with integral portions 124 of fastener means serving to separably secure the shroud to the support 96 in the housing 30. The oval opening 115 is surrounded by an upwardly extending collar 116 which carries an annular sealing element 117 (see FIG. 17) which is in sealing contact with the underside of the partition 118 to thus ensure that spent air which issues from the shroud via opening 115 enters the aperture or apertures 121 of the partition 118. The sealing element 117 has a substantially U-shaped cross-sectional outline and at least partially surrounds the upper portion of the collar 116.

The shroud 36 is further formed with one or more chambers 119 for elastic cushioning means 120 (see FIG. 17) surrounding the adjacent portion or portions 125a the motor 125. The cushioning means 120 can be said to constitute a means for separably securing the casing of the motor 125 to the shroud 36 so that the motor can be deposited on or lifted above and away from the support 96 together with the shroud. However, it is equally possible to separably affix the motor 125 to the support 96 and to affix the shroud 36 to the support 96 or to another part of the housing 30 independently of the motor.

The arrow 129 indicates in FIG. 17 that the air stream or streams flowing from the opening 115 toward the surrounding atmosphere are deflected several times so as to ensure adequate cooling of the respective portion of the housing 30 as well as to prevent the streams from blowing straight into the face of an operator looking downwardly at the knob 91.

The integral portions 124 of the shroud 36 can form part of any one of a variety of suitable fastener means for releasably securing the shroud 36 to the support 96. For example, the portions 124 can form part of a bayonet mount which allows for rapid attachment of the shroud 36 to or its detachment from the support 96. The portions 124 can also constitute the male or female elements of a suitable detent structure, of a snap-on connection or of any other means which is capable of reliably but detachably holding the shroud 36 in requisite position in the respective portion of the housing 30. It is also possible to secure the shroud 36 to the support 96 by screws, bolts, clamps, pins, clips or the like.

The adapter 56 can be modified by omitting its shank 76 if the food processor is to be used with tools which should rotate in the lower portion of the interior of the bowl 32. Such short adapter need not be centered by the cover 34 in a manner as shown in FIG. 4, i.e., the female bearing portion 77 and the bearing pin 78 can be omitted. Alternatively, the improved food processor can be furnished with one or more adapters of the type shown in FIG. 4 as well as with one or more simpler adapters which do not have any shanks and are centered solely by the insulating member 52. It is also possible to merely shorten the shank 76 so that it does not extend all the way to the cover 34 and is not centered by the cover but the shank is still provided with a coupling element 80 or an analogous coupling element for transmission of torque to a carrier 81 or directly to a tool, e.g., to the grating tool 84.

The number of tools which can be used in the improved food processor is practically unlimited. All that is necessary is to ensure that the tools can be properly mounted directly on the outer portion 59 or on the shank 76 of the adapter 56 or an equivalent adapter, or that the tools can be mounted on the carrier 81 or an equivalent carrier. The coupling elements of the adapter, of the insulating member 52, of the spindle 42, of the carrier 81 or of the tools can depart from those which are shown in the drawing; all that is necessary is to ensure adequate transmission of torque from the output shaft 37 of the motor 125 to the selected tool or tools on the adapter or on the tool carrier. The configuration of teeth or keys on the coupling elements can also depart from those which are shown in the drawing, and the same applies for the distribution of such male torque transmitting parts as considered in the circumferential direction of the coupling elements.

The carrier 81 can be designed to support certain types of tools (e.g., grating or dicing tools for cheese, potatoes or the like) whereas the adapter can directly support all other types of tools. However, it is also possible to design each and every tool in such a way that it can be mounted on the tool carrier or the food processor can be furnished with two or more different adapters each of which can be designed to transmit torque to one or more specific tools. The tool carrier 81 constitutes an optional feature of the apparatus because the shank 76 can be designed to accept the hubs of tools directly rather than through the medium of a carrier.

The food processor can be furnished with three different types of adapters, namely one or more first adapters whose height does not exceed the height of the outer tubular portion 59 and insulating member 52 and each of which can transmit torque to a tool close to the bottom wall 50 of the bowl 32, one or more second adapters each of which has the tubular portions 55, 59 and a shank 76 which has a coupling element 80 but does not extend all the way to the underside of the cover 34, and one or more third adapters each of which is identical with or similar to the adapter 56 of FIG. 4. The illustrated adapter is preferred at this time because of its versatility, i.e., it can support a carrier 81, it can transmit torque to a tool which is closely adjacent to the bottom wall 50, it can transmit torque to a tool which is closely adjacent to the cover 34 and tube 35 but is mounted directly on the shank 76, and it can transmit torque to a tool through the medium of the carrier 81.

The present invention is based on the recognition that it is not absolutely necessary to place a selected tool in the bowl of a food processor into direct torque-receiving engagement with the insulating sleeve which is driven by the spindle. In fact, the utilization of an adapter renders it possible to greatly reduce the dimensions, complexity and cost of the tools because they need not be provided with cupped portions or with analogous means for concealing the insulating sleeve and/or with discrete handles. Thus, the adapter can constitute a convenient handle which is grasped when the operator wishes to insert a tool into or to remove a tool from the interior of the bowl. The adapter and the selected tool can be assembled prior to insertion of the adapter into the bowl, and the selected tool can be separated from the adapter after it has served its purpose subsequent to withdrawal of the adapter from the bowl. It has been found that the bulk and cost of tools which are used in conjunction with the improved adapter can be reduced to a fraction of the bulk and cost of heretofore known tools which receive torque directly from the spindle or from the insulating sleeve. A single adapter can serve to transmit torque to a variety of different tools and the cost of such adapter is a small fraction of the difference between the cost of a set of relatively simple and compact tools which can be used with the adapter and the cost of a set of presently known much bulkier and more complex tools which are used in conventional adapters and receive torque from the insulating member or from the spindle. The cost of the adapter (which can be made of a single piece of a suitable metallic or synthetic plastic material) is low because such component of the food processor can constitute a one-piece body which can be mass-produced in available machines and in accordance with conventional techniques. All that is necessary is to provide the adapter with a coupling element which receives torque from the insulating sleeve and with one or more coupling devices (depending upon whether the adapter has a shank and whether the shank is provided with a coupling device in addition to the coupling device on the outer tubular portion of the adapter) which can transmit torque directly to selected tools and/or to a suitable tool carrier.

It is up to the operator to leave the adapter in the bowl and to simply detach the tool from the adapter or from the carrier on the shank of the adapter. Also, the operator of the food processor can leave the adapter in the bowl and remove a tool with the carrier. Alternatively, and as explained above, the adapter can be removed with a tool and reinserted with a selected tool or with the carrier and a selected tool on the carrier. For example, the adapter can be left on the insulating sleeve 52 during the processing of a particular foodstuff or a combination of foodstuffs but is removed after completed use of the last of a series of two or more different tools for convenient cleaning of the bowl, of the adapter and of the tool.

The removal of tools or of the tool carrier from the shank 76 of the adapter is a particularly simple and time-saving operation. However, the removal of a tool from the outer tubular portion 59, while the adapter 56 remains in the main portion 50, 50a of the bowl 32, is also a very simple and time-saving operation. As mentioned above, the tools which are used in conjunction with the adapter 56, either directly on the tubular portion 59 or shank 76 of the adapter or on the carrier 81, can be much more compact and much less expensive than but just as efficient as heretofore known tools which are mounted directly on the insulating sleeve of a conventional food processor. The utilization of small and compact tools brings about additional advantages and savings, especially as concerns the space requirements of the tools for storage, their initial cost, their replacement cost and their overall weight.

While it is possible to deviate from the illustrated construction and configuration of coupling elements 55, 58 and coupling devices 60, 61, 80 and 83, the provision of such coupling devices and coupling elements is preferred at this time because they allow for reliable transmission of torque from the insulating sleeve 52 to the adapter 56 as well as from the adapter to a selected tool or to the tool carrier 81 and also because they render it possible to install the adapter on the sleeve 52, a selected tool on the outer tubular portion 59, a selected tool on the shank 76 or the carrier 81 on the shank 76 in any one of a substantial number of different angular positions in each of which the thus assembled parts are in reliable torque transmitting and torque receiving engagement with each other. The transmission of torque results in uniform stressing of the spindle 42, of the insulating sleeve 52, of the adapter 56, of a tool on the adapter, of the carrier 81 and of a tool on the carrier (as considered in the circumferential direction) if the keys or teeth of the various coupling devices and coupling elements are uniformly distributed around the periphery of the spindle 42. The feature that the keys or teeth of the coupling devices and coupling elements extend in parallelism with the axis of the spindle 42 contributes to lower cost of the respective parts and also to more uniform distribution of forces during transmission of torque from the motor 125 to a selected tool in the interior of the bowl 32. However, and as already mentioned above, it is also possible to design the various coupling devices and coupling elements in such a way that their keys or teeth and splines or grooves are inclined with reference to the axis of the spindle 42. This may be desirable or even necessary under certain special circumstances, e.g., to reduce the likelihood of axial movement of cooperating parts relative to each other when the motor 125 is on. Even if the keys and splines are inclined relative to the axis of the spindle 42, they are preferably equidistant from each other as considered in the circumferential direction of the insulating sleeve.

The annular end portions 69 of hubs on the improved tools can be replaced with other means for ensuring that the tools can be held on the adapter in predetermined axial positions. Such end portions have been found to constitute very simple and highly effective means which can cooperate with the stop 59a of the adapter to ensure that the tools are held at a selected distance from the bottom wall 50 of the bowl 32. Moreover, the stop 59a is present anyway if the coupling element 60 does not extend along the full length of the outer tubular portion 59. Still further, the stop 59a can cooperate with the end portions 69 of the hubs of improved tools to ensure automatic extraction of a tool which surrounds the outer tubular portion 59 in response to lifting of the adapter 56 out of the bowl. Thus, the end portions 69 of the tools and the stop 59a of the adapter 56 can perform several useful functions.

The axial length of the adapter 56 need not greatly exceed the axial length of the insulating sleeve 52 if the adapter is not intended for use with a tool carrier 81 and/or if the adapter is not intended to carry a tool close to the underside of the cover 34. Such relatively short adapter is adequately centered in the bowl even if its upper end portion is remote from and is not engaged by a bearing at the underside of the cover.

The illustrated adapter 56 exhibits the important advantage that its shank 76 can directly or indirectly support a tool which serves to treat (particularly sever) the admitted foodstuffs close to the lower end of the material feeding tube 35. The axial length of the coupling element 80 on the shank 76 can be a relatively small fraction of the axial length of the shank, as long as it suffices for reliable transmission of torque to the carrier 81 or directly to a tool whose internal coupling element is in direct torque-receiving engagement with the coupling element 80. The coupling element 80 can include two or more axially staggered annular or arcuate sections.

Since the illustrated shank 76 has a substantially conical shape, the hub 82 of the tool carrier 81 need not extend all the way into contact with the top end of the outer tubular portion 59 of the adapter 56, i.e., the hub 82 can come to a halt at a given distance from the outer tubular portion 59 if the dimensions of its passage are properly selected to ensure that the disc-shaped main portion 81a of the carrier cannot move beyond a predetermined foremost (lowermost) axial position in a direction toward the outer tubular portion 59 of the adapter. The utilization of a one-piece tool carrier contributes to lower cost of such part. This carrier can support a tool (such as a grating tool 84) thereon in immediate proximity of the lower end of the material feeding tube 35 or at a desired optimum distance from the underside of the cover 34. The manner in which one can regulate the thickness of slices which are severed from the admitted foodstuffs by an orbiting tool in the interior of a bowl in a food processor is known per se and need not be described here.

The upper end portion of the shank 76 need not always be centered by the cover 34, especially if the food processor is not designed to carry out heavy duty severing, blending, whipping or like material processing work. However, the simple expedient of providing the underside of the cover 34 with centering means for the upper end portion of the shank 76 contributes significantly to stability of the adapter in the interior of the bowl and to the ability of an orbiting tool in the bowl to sever and/or otherwise treat relatively hard (e.g., raw) foodstuffs. As shown in FIG. 4, the bearing portion 77 is provided at the center of the cover 34 so that the latter can be readily turned about the axis of the adapter 56 to move its toothed extension 86 into or out of the slot 94 in the housing 30. Thus, the feature that the cover 34 carries the bearing pin 78 for the shank 76 of the adapter 56 does not interfere with manipulation of the cover for the purpose of placing it onto the wall 50a, for the purpose of lifting it off the wall 50a and/or for the purpose of moving its extension 86 into engagement with the gear 88 as well as of moving its retaining portion 112 into and from engagement with the ledge 113 of the housing 30.

The provision of the aforediscussed smooth-surfaced cylindrical portion at the upper end of the shank 76 of the improved adapter is desirable and advantageous when it is necessary or preferred to establish a large or relatively large surface-to-surface contact between a tool on the carrier 81 and the shank 76. Thus, and referring again to FIG. 11, the collar 103 contacts only the radially outermost portions of the keys which form part of the coupling device 80 on the shank 76. However, if the uppermost part of the shank 76 constitutes a cylinder, the inner diameter of the collar 103 can match the diameter of such cylinder so that the tool on the carrier 81 is more reliably held against wobbling and/or other stray movements with reference to the adapter 56. The just discussed cylindrical end portion of the adapter 56 is indicated in FIG. 9 by broken lines and is denoted by the character 176.

The improved safety device exhibits the advantage that it comprises a surprisingly small number of simple and inexpensive parts, basically only a toothed extension 86 on the cover 34 and a simple gear 88 which is rotatable (within limits) in the interior of the housing 30 to and from a predetermined angular position (FIG. 18) in which the skirt 108 of the knob 91 can enter the slots 111 of the upper tubular extension 90. In any other angular position of the gear 88 (i.e., when the cover 34 is not properly mounted on the main portion 50, 50a of the bowl 32), the edge face bounding the one or the other end of the slot 131 in the skirt 108 of the knob 91 strikes against the external surface of the upper tubular extension 90 and prevents actuation of the switch 92 for the purpose of starting and/or changing the speed of the motor 125.

The purpose of the aforediscussed torsion spring or other suitable means for yieldably biasing the gear 88 to an angular position in which the stop 89 is received in the left-hand end of the recess 95, as viewed in FIG. 18, is desirable and advantageous because the gear 88 is then in an optimum angular position for engagement with the toothed extension or segment 86 when the cover 34 is placed onto the wall 50a and is rotated in a counterclockwise direction, as viewed in FIG. 18, for the purpose of moving the gear 88 to the illustrated predetermined angular position and of engaging the L-shaped retaining portion 12 with the ledge 113.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A food processor for use with a tool having an internal coupling device, comprising a housing; an electric motor in said housing; a bowl removably mounted in said housing and having an interior and a main portion including a bottom wall provided with a tubular extension in the interior of said bowl; a rotary tool spindle journalled in said housing and surrounded by said extension; means for insulating said spindle in said extension; means for transmitting rotary motion from said motor to said spindle; a tubular adapter disposed in said bowl and having an outer member with at least one external coupling device arranged to mate with the internal coupling device of the tool which is to be driven by said adapter, and an inner member rotatable with said outer member; and means for transmitting torque from said spindle to said adapter, said torque transmitting means comprising coupling means for allowing said adapter to rotate with said spindle, said coupling means including at least one first coupling element carried by said spindle and at least one second coupling element provided on said inner member and cooperating with said first coupling element, said second coupling element being movable relative to said first coupling element and relative to said insulating means so as to allow for separation of said adapter from said first coupling element.

2. The food processor of claim 1, wherein said insulating means comprises a sleeve-like member which is interposed between said spindle and said inner member and is driven by said spindle, said torque transmitting means further comprising an external coupling element provided on said sleeve-like member and an internal coupling element provided in said adapter and mating with said external coupling element.

3. The food processor of claim 1, wherein said coupling elements and said coupling devices have complementary undulate circular outlines, each of said coupling elements and said coupling devices including keys alternating with splines, with the keys of each of said coupling elements extending into the splines of each of the other coupling elements, and the keys of each of said coupling devices extending into the splines of each of the other of said coupling devices.

4. The food processor of claim 3, wherein said spindle has an axis, and said keys and said splines are parallel to the axis of said spindle.

5. The food processor of claim 3, wherein the keys of each of said coupling elements and the keys of each of said coupling devices are equidistant from each other, as considered in the direction of rotation of said spindle.

6. The food processor of claim 1, wherein the tool has a huh and an inwardly extending annular end portion at one axial end of the hub, and wherein said adapter has a substantially shoulder-like external stop which engages with the annular end portion of the hub of the tool, when the tool is mounted thereon with the internal coupling device mating with said external coupling device.

7. The food processor of claim 1, wherein said outer member includes a tubular portion which is provided with said external coupling device, and a shank which extends axially beyond said tubular portion and has a second external coupling device for engagement with the internal coupling device of the tool.

8. The food processor of claim 7, further comprising a tool carrier having a hub and an internal coupling device provided in said hub and arranged to mate with the external coupling device of said shank.

9. The food processor of claim 8, wherein said carrier is a one-piece body.

10. The food processor of claim 8, wherein said carrier includes means for separably supporting and rotating the tool.

11. The food processor of claim 8, wherein the tool has at least one substantially radial protuberance, and wherein said carrier has a marginal portion arranged to engage with and to retain the radial protuberance of the tool so that the tool is ready to receive torque from said adapter by way of said carrier.

12. The food processor of claim 11 wherein the tool further includes, a centrally disposed hole, and a collar surrounding the hole and wherein said shank extends into the collar of the tool when the tool is mounted on said carrier.

13. The food processor of claim 2, wherein said bowl further comprises a cover which is removably mounted on said main portion, said shank having an end portion which is remote from said bottom wall and said cover having means for centering said end portion.

14. The food processor of claim 13, wherein said end portion of said shank has a hole and said centering means comprises a bearing pin extending into said hole when said cover is mounted on said main portion.

15. The food processor of claim 8, wherein said shank includes a cylindrical end portion which is remote from said bottom wall.

16. The food processor of claim 1, wherein said bowl further includes a cover which is removably mounted on said main portion, and further comprising a safety device for preventing operation of said motor when said cover is removed from said main portion.

17. The food processor of claim 16, wherein said safety device comprises a toothed member on said cover and a gear rotatably mounted in said housing and mating with said toothed member when said cover is properly mounted on said main portion, so that said toothed member maintains said gear in a predetermined angular position in which said gear allows for operation of said motor.

18. The food processor of claim 17, wherein said housing has a slot, said toothed member extending into said slot and meshing with said gear when the cover is properly mounted on said main portion.

19. The food processor of claim 17, further comprising means for operating said motor including a switch mounted in said housing and an actuating member rotatably mounted in said housing and operatively connected with said switch, said actuating member being rotatable relative to the housing to thereby operate said motor by way of said switch in said predetermined angular position of said gear.

20. The food processor of claim 19, wherein said gear comprises a toothed flange and a tubular extension having at least one slot which registers with a portion of and permits rotation of said actuating member only in said predetermined angular position of said gear.

21. The food processor of claim 20, wherein said gear further comprises a second tubular extension and said housing comprises a projection extending into said second tubular extension and rotatably mounting said gear.

22. The food processor of claim 21, wherein said tubular extensions are disposed at opposite sides of said flange.

23. The food processor of claim 20, wherein said flange has a recess and said housing comprises a stop extending into said recess to limit extent of angular movement of said gear under the action of said toothed member.

24. The food processor of claim 17, wherein said main portion and said cover include complementary retaining means, and the retaining means of said cover engages the retaining means of said main portion when said toothed member maintains said gear in said predetermined angular position.

25. The food processor of claim 24, wherein the retaining means of said main portion includes a ledge and the retaining means of said cover includes a substantially L-shaped member which overlies said ledge when said toothed member maintains said gear in said predetermined angular position.

* * * * *